US012561250B2

(12) United States Patent
Kim

(10) Patent No.: US 12,561,250 B2
(45) Date of Patent: Feb. 24, 2026

(54) STORAGE DEVICE FOR MANAGING MAP DATA IN A HOST AND OPERATION METHOD THEREOF

(71) Applicant: SK hynix Inc., Gyeonggi-do (KR)

(72) Inventor: Ki Young Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/457,352

(22) Filed: Aug. 29, 2023

(65) Prior Publication Data

US 2024/0256457 A1 Aug. 1, 2024

(30) Foreign Application Priority Data

Feb. 1, 2023 (KR) ........................ 10-2023-0013654

(51) Int. Cl.
*G06F 12/0862* (2016.01)
*G06F 12/02* (2006.01)

(52) U.S. Cl.
CPC ...... *G06F 12/0862* (2013.01); *G06F 12/0292* (2013.01); *G06F 2212/2022* (2013.01)

(58) Field of Classification Search
None
See application file for complete search history.

(56) References Cited

U.S. PATENT DOCUMENTS

| | | | |
|---|---|---|---|
| 2020/0387445 A1* | 12/2020 | Byun | G06F 3/0656 |
| 2021/0303208 A1* | 9/2021 | Brief | G06F 3/0613 |
| 2021/0349655 A1* | 11/2021 | Lin | G06F 3/0604 |

| | | | |
|---|---|---|---|
| 2021/0397370 A1 | 12/2021 | Chen | |
| 2022/0004498 A1* | 1/2022 | Chen | G06F 3/0647 |
| 2022/0012174 A1* | 1/2022 | Seok | G06F 3/061 |
| 2022/0058134 A1* | 2/2022 | Minopoli | G06F 12/0866 |
| 2022/0253245 A1* | 8/2022 | Seo | G06F 3/0679 |
| 2022/0253388 A1* | 8/2022 | Zhang | G06F 12/0868 |
| 2022/0382452 A1* | 12/2022 | Inbar | G06F 3/0619 |
| 2023/0065617 A1* | 3/2023 | Guan | G06F 1/30 |
| 2023/0100149 A1* | 3/2023 | Segev | G06F 3/0619 |
| | | | 711/154 |
| 2023/0229590 A1* | 7/2023 | Bi | G06F 12/0292 |
| | | | 711/154 |

FOREIGN PATENT DOCUMENTS

KR 10-2020-0139913 A 12/2020

* cited by examiner

*Primary Examiner* — Ryan Bertram
*Assistant Examiner* — Edmund H Kwong
(74) *Attorney, Agent, or Firm* — IP & T GROUP LLP

(57) ABSTRACT

Provided are a storage device capable of reducing formation time of map data required for an HPB read operation and stored in a host, and an operation method thereof. The operation method of a memory controller includes performing a host performance booster (HPB) read operation of reading data from a memory in response to a read request from a first external device using map data stored in a plurality of map data areas of a volatile memory area of the first external device, obtaining a usage frequency for each of the plurality of map data areas, and storing information on at least one map data area with a highest usage frequency in an HPB priority buffer configured as a non-volatile memory.

17 Claims, 8 Drawing Sheets

FIG. 7

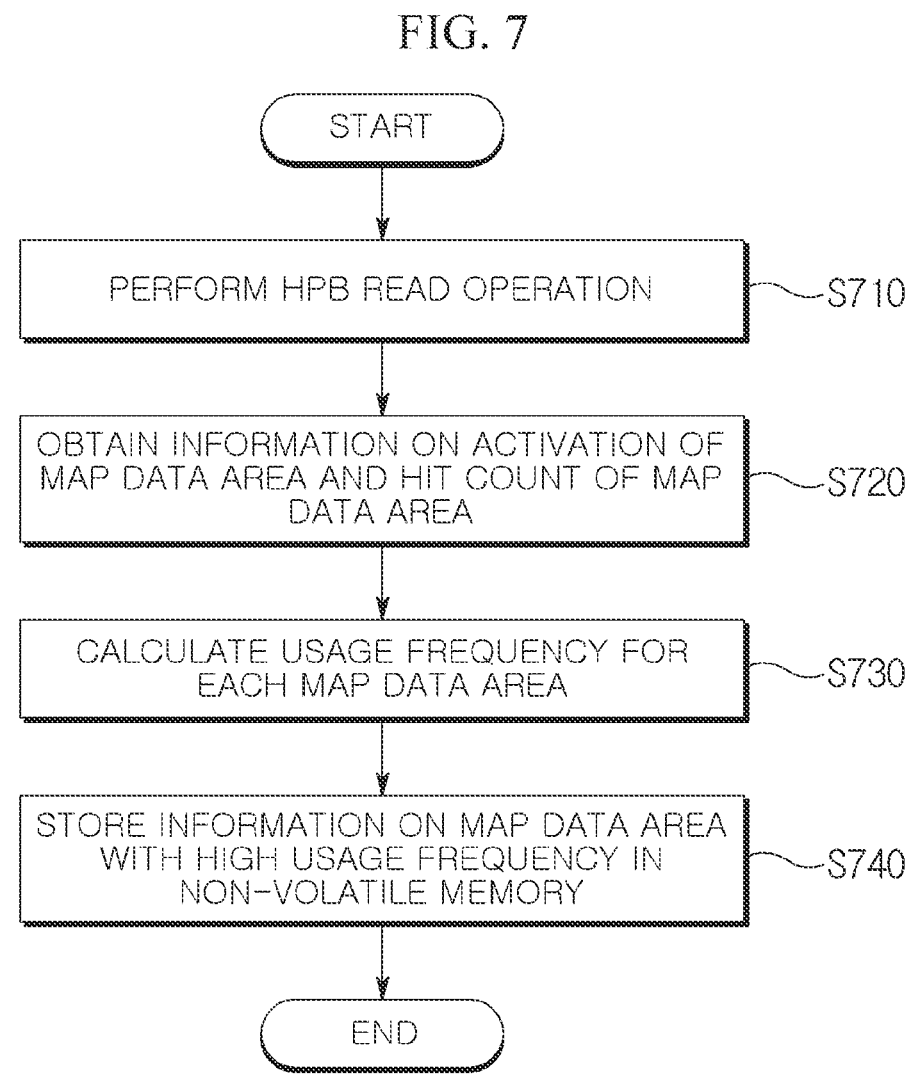

```
                    ┌─────────────┐
                    │    START    │
                    └─────────────┘
                           │
                           ▼
        ┌──────────────────────────────────────┐
        │     PERFORM HPB READ OPERATION        │─── S710
        └──────────────────────────────────────┘
                           │
                           ▼
        ┌──────────────────────────────────────┐
        │  OBTAIN INFORMATION ON ACTIVATION OF  │
        │  MAP DATA AREA AND HIT COUNT OF MAP   │─── S720
        │              DATA AREA                │
        └──────────────────────────────────────┘
                           │
                           ▼
        ┌──────────────────────────────────────┐
        │    CALCULATE USAGE FREQUENCY FOR      │
        │          EACH MAP DATA AREA           │─── S730
        └──────────────────────────────────────┘
                           │
                           ▼
        ┌──────────────────────────────────────┐
        │  STORE INFORMATION ON MAP DATA AREA   │
        │   WITH HIGH USAGE FREQUENCY IN        │─── S740
        │          NON-VOLATILE MEMORY          │
        └──────────────────────────────────────┘
                           │
                           ▼
                    ┌─────────────┐
                    │     END     │
                    └─────────────┘
```

STORAGE DEVICE FOR MANAGING MAP DATA IN A HOST AND OPERATION METHOD THEREOF

CROSS REFERENCE TO RELATED APPLICATION

The present application claims the benefit under 35 USC § 119(a) of Korean Patent Application No. 10-2023-0013654, filed Feb. 1, 2023, the entire contents of which are incorporated herein for all purposes by this reference.

TECHNICAL FIELD

Various embodiments of the present disclosure relate to a method of managing map data stored in a host, and to a storage device capable of reducing map data formation time, and an operation method thereof.

BACKGROUND

A storage device is capable of storing data according to a request from an external device such as a computer, a smart phone, a tablet PC, or the like.

The storage device may include a memory for storing data and a memory controller for controlling the memory. The memory controller may receive a request from the external device. According to the received request, the memory controller may perform or control operations for reading data from the memory, writing (programming) data to the memory, or erasing data of the memory.

A logical address where data recognized by an external device is stored may be different from a physical address where data is stored physically in a storage device. Accordingly, the storage device may store a translation relationship between a logical address and a physical address in an internal volatile memory as map data. However, a large amount of map data may not be stored due to the limited capacity of the internal volatile memory provided in the storage device. In order to resolve this issue, a portion of a volatile memory provided in an external device may be allocated and used to store map data.

In this case, when a sudden power-off (SPO) occurs, all map data stored in the volatile memory of the external device are deleted and map data should be stored again. However, considerable time may be taken to form new map data.

SUMMARY

Various embodiments of the present disclosure provide a storage device capable of rapidly forming new map data in the above-described situation, and an operation method of the storage device.

The technical tasks to be achieved in the present disclosure are not limited to the technical tasks mentioned above, and other technical tasks not mentioned can be clearly understood by those of ordinary skill in the art to which the present disclosure belongs from the description below.

According to embodiments of the present disclosure, an operation method of a memory controller may include performing a host performance booster (HPB) read operation of reading data from a memory in response to a read request from an external device using map data stored in a plurality of map data areas of a volatile memory area of the external device, obtaining a usage frequency for each of the plurality of map data areas, and storing information on at least one map data area with a high usage frequency among the plurality of map data areas in a first HPB priority buffer configured as a non-volatile memory.

According to embodiments of the present disclosure, a memory controller may include a host interface configured to communicate with an external device, a memory interface configured to communicate with a memory and a controller configured to transmit a recommendation signal including information on a map data area of which activation is recommended to the external device, transmit map data included in a first map data area to the external device based on reception of a map data request for the first map data area from the external device, perform a host performance booster (HPB) read operation of reading data from the memory in response to a read request from the external device using map data stored in a plurality of map data areas of a volatile memory area of the external device, obtain a usage frequency for each of the plurality of map data areas, and store information on at least one map data area with a high usage frequency among the plurality of map data areas in a first HPB priority buffer configured as a non-volatile memory.

According to embodiments of the present disclosure, a storage device may include a non-volatile memory including an HPB priority buffer area, and a memory controller configured to transmit a recommendation signal including information on a map data area of which activation is recommended to an external device, transmit map data included in a first map data area to the first external device based on reception of a map data request for the first map data area from the external device, perform a host performance booster (HPB) read operation of reading data from the non-volatile memory in response to a read request from the external device using map data stored in a plurality of map data areas of a volatile memory area of the external device, obtain a usage frequency for each of the plurality of map data areas, and store information on at least one map data area with a high usage frequency among the plurality of map data areas in a first HPB priority buffer.

BRIEF DESCRIPTION OF THE DRAWINGS

FIG. 7 is a flowchart for describing an improved host performance booster read operation in a storage device according to embodiments of the present disclosure.

DETAILED DESCRIPTION

Hereinafter, various embodiments of the present disclosure will be described in detail with reference to the accompanying drawings.

Figure 1:
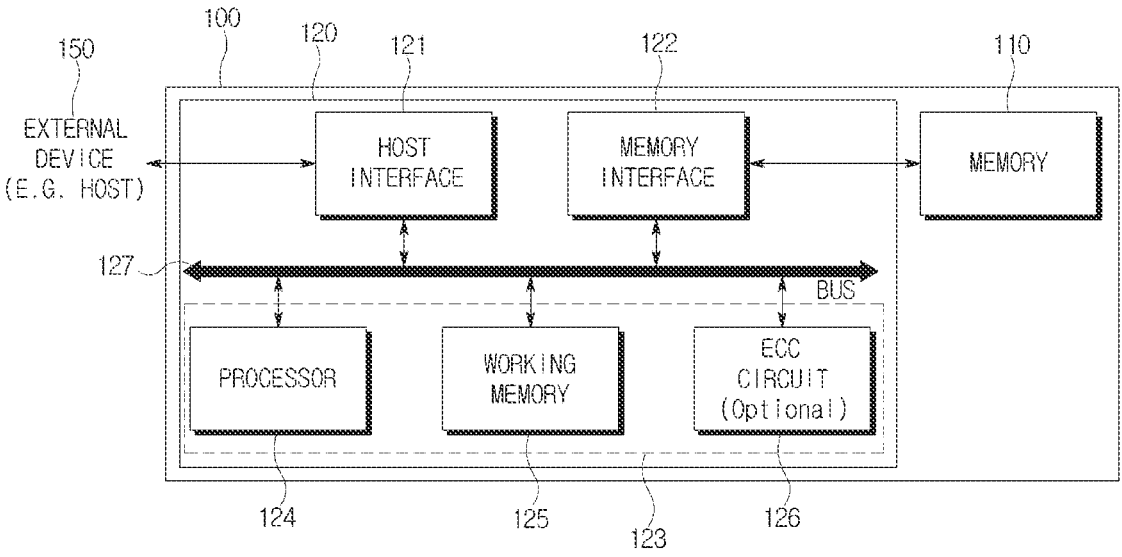
FIG. 1 is a diagram schematically illustrating a configuration of a storage device according to embodiments of the present disclosure.

FIG. 1 is a diagram schematically illustrating a configuration of a storage device 100 according to embodiments of the present disclosure.

Referring to FIG. 1, the storage device 100 may include a memory 110 that stores data and a controller 120 that controls the memory 110. In an embodiment, additional components may be further included in the storage device 100.

The memory 110 may operate in response to control of the controller 120. In an embodiment, the memory 110 may perform operations that include, for example, a read operation, a program operation (also referred to as "write operation"), and an erase operation.

For example, the memory 110 may include various types of non-volatile memories, such as NAND flash memory, 3D NAND flash memory, NOR flash memory, resistive random access memory (RRAM), Phase-Change Memory (PRAM), Magnetoresistive Random Access Memory (MRAM), Ferroelectric Random Access Memory (FRAM), or Spin Transfer Torque Random Access Memory (STT-RAM) and the like.

The memory 110 may be implemented as a three-dimensional array structure. The embodiments of the present disclosure may be applied not only to a flash memory in which a charge storage layer is made of a conductive floating gate, but also to a charge trap flash (CTF) in which a charge storage layer is made of an insulating film.

The memory 110 may receive a command, an address or the like from the controller 120 (also referred to as a memory controller), and access a region of a memory cell array selected by the address. That is, the memory 110 may perform an operation instructed by a command on the region selected by the address.

For example, the memory 110 may perform a program operation, a read operation, an erase operation or the like. During a program operation, the memory 110 may program data in the region selected by the address. During a read operation, the memory 110 may read data from the region selected by the address. During an erase operation, the memory 110 may erase data stored in the region selected by the address.

The controller 120 may control program (write), read, erase, and background operations with respect to the memory 110. Here, the background operation may include one or more of garbage collection (GC), wear leveling (WL), read reclaim (RR), or bad block management (BBM) operations.

The controller 120 may control an operation of the memory 110 according to a request from an external device (e.g., a host) 150 located outside the storage device 100. The operation of the memory 110 may be controlled according to a request from the host. On the other hand, the controller 120 may control an operation of the memory 110 regardless of a request from an external device.

The external device 150 may include a computer, an Ultra Mobile PC (UMPC), a workstation, a Personal Digital Assistant (PDA), a tablet PC, a mobile phone, a smart phone, an e-book, a portable multimedia player (PMP), a portable game machine, a navigation device, a black box, a digital camera, a Digital Multimedia Broadcasting (DMB) player, a smart television, a digital audio recorder, a digital audio player, a digital picture recorder, a digital picture player, a digital video recorder, a digital video player, a storage constituting a data center, one of various electronic devices constituting a home network, one of various electronic devices constituting a computer network, one of various electronic devices constituting a telematics network, a radio frequency identification (RFID) device, a mobility device (e.g., vehicle, robot, drone) that travels on the ground, water, or air under human control or autonomously travels, and the like.

The external device 150 may include at least one operating system (OS). The operating system may generally manage and control functions and operations of the external device 150, and provide mutual operation between the external device 150 and the storage device 100. The operating system may be classified into a general operating system and a mobile operating system according to the mobility of an external device.

The controller 120 and an external device may be separate devices. In some cases, the controller 120 and the external device may be implemented as an integrated device. Hereinafter, for convenience of description, a description will be given by taking, as an example, a case in which the controller 120 and an external device are separate devices.

Referring to FIG. 1, the controller 120 may include a host interface 121, a memory interface 122, and a control circuit 123.

The host interface 121 may provide an interface for communication with the external device 150. For example, the host interface 121 may include an interface using at least one of various communication standards or interfaces such as a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, an SCSI (small computer small interface) protocol, an enhanced small disk interface (ESDI) protocol, an integrated drive electronics (IDE) protocol, a system management bus (SMBus) protocol, an inter-integrated circuit (I2C) protocol, an improved inter-integrated circuit (I3C) protocol, a proprietary protocol, and the like.

The memory interface 122 may be connected to the memory 110 to provide an interface for communication with the memory 110. That is, the memory interface 122 may provide an interface between the memory 110 and the controller 120 in response to control by the control circuit 123.

The control circuit 123 may receive a request through the host interface 121 and perform an operation for processing the received request.

The control circuit 123 may control the operation of the memory 110 by performing overall control operations of the controller 120. To this end, according to an embodiment, the control circuit 123 may include a processor 124 and a working memory 125, and optionally may further include an error detection and correction circuit (ECC Circuit) 126.

The processor 124 may control operations of the controller 120.

The processor 124 may communicate with an external device through the host interface 121 and communicate with the memory 110 through the memory interface 122.

The processor 124 may perform a function of a Flash Translation Layer (FTL). The processor 124 may translate a logical address provided by an external device into a physical address through a flash translation layer (FTL). The flash translation layer may receive a logical address and translate the logical address into a physical address using a mapping table. Here, the logical address and the physical address may be a logical block address or a physical block address representing one memory area.

There are several methods for address mapping of the flash translation layer according to mapping units. Representative address mapping methods may include a page mapping method, a block mapping method, and a hybrid mapping method.

The processor 124 may randomize data received from an external device. For example, the processor 124 may randomize data received from an external device using a set randomizing seed. The randomized data may be provided to the memory 110 and programmed in the memory 110.

The processor 124 may de-randomize data received from the memory 110 during a read operation. For example, the processor 124 may derandomize data received from the memory 110 using a de-randomizing seed. The de-randomized data may be output to the external device.

The processor 124 may perform background functions for the memory 110, such as a garbage collection (GC) function, a wear leveling (WL) function, and a bad block management function.

The garbage collection function may refer to a function of collecting pieces of data partially recorded in memory blocks, and moving and recording the data into another memory block in order to secure a free space to record data when there is not enough space to record data in the memory 110.

The wear leveling function may be a function for evenly writing data to all memory blocks of the memory 110 to prevent excessive use of a specific block in order to prevent errors and data loss of the memory 110 in advance and improve durability and stability of a product.

The bad block management function may be a function of detecting a bad block in the memory 110 and, when there is a reserved block, preventing data from being written to the bad block by replacing the bad block with the reserved block.

The processor 124 may control the operation of the controller 120 by executing firmware. The processor 124 may control operations of the controller 120 and execute (drive) firmware stored in the working memory 125 during booting. Hereinafter, the operation of the storage device 100 may be implemented in a manner in which the processor 124 executes firmware in which a corresponding operation is defined.

The firmware is a program executed in the storage device 100 to drive the storage device 100 and may include various functional layers. For example, the firmware may include binary data in which codes for executing each of the aforementioned functional layers are defined.

For example, the firmware may include a flash translation layer (FTL) that performs a translation function between a logical address for transmission from an external device to the storage device 100 and a physical address of the memory 110, a host interface layer (HIL) that interprets a request received from an external device through the host interface 121 and transfers the interpreted request to the flash translation layer, and a flash interface layer (FIL) that transfers a command, corresponding to the interpreted request, instructed by the flash translation layer to the memory 110.

In an embodiment, the firmware may include a garbage collection function, a wear leveling function, and a bad block management function.

The firmware may be loaded into the working memory 125 from, for example, the memory 110 or a separate non-volatile memory (e.g., ROM, NOR Flash) located outside the memory 110. When executing a booting operation after power-on, the processor 124 may first load all or part of the firmware into the working memory 125.

The processor 124 may perform logic operations defined in firmware loaded into the working memory 125 to control the operations of the controller 120. The processor 124 may store a result of performing the logic operation defined in the firmware in the working memory 125. The processor 124 may allow the controller 120 to generate a command or a signal according to the result of performing the logic operation defined in the firmware. When the part of the firmware in which the logical operation to be performed is defined is not loaded into the working memory 125, the processor 124 may generate an event (e.g., interrupt) for loading the corresponding part of the firmware into the working memory 125.

The processor 124 may load meta data required to drive the firmware from the memory 110. The meta data is data for managing the memory 110 and may include management information about user data stored in the memory 110.

The firmware may be updated while the storage device 100 is being produced or the storage device 100 is running. The controller 120 may download new firmware from the outside of the storage device 100 and update existing firmware with the new firmware.

The working memory 125 may store firmware, program codes, commands, or data required to drive the controller 120. The working memory 125 is, for example, a volatile memory, and may include one or more of static RAM (SRAM), dynamic RAM (DRAM), and synchronous DRAM (SDRAM).

The error detection and correction circuit 126 may detect an error bit of target data using an error correction code and correct the detected error bit(s). The target data may be, for example, data stored in the working memory 125 or data read from the memory 110.

The error detection and correction circuitry 126 may be implemented to decode data with an error correction code. The error detection and correction circuitry 126 may be implemented with a variety of decoders. For example, a decoder performing non-systematic decoding or a decoder performing systematic decoding may be used.

For example, the error detection and correction circuitry 126 may detect an error bit in units of sectors set for each read data. That is, each read data may be composed of a plurality of sectors. A sector may refer to a data unit smaller than a page, which is a read unit of a flash memory. Sectors constituting each read data may be associated with each other through addresses.

The error detection and correction circuit 126 may calculate a bit error rate (BER) and determine whether correction is possible in units of sectors. For example, when the bit error rate (BER) is higher than a set reference value, the error detection and correction circuit 126 may determine that a corresponding sector is uncorrectable or a fail. On the other hand, when the bit error rate (BER) is lower than the reference value, the error detection and correction circuit 126 may determine that a corresponding sector is correctable or a pass.

The error detection and correction circuit 126 may perform error detection and correction operation on all pieces of read data, sequentially. When a sector included in read data is correctable, the error detection and correction circuit 126 may omit an error detection and correction operation for a corresponding sector of next read data. When the error detection and correction operation has been performed on all pieces of read data, the error detection and correction circuit 126 may detect sectors finally determined to be uncorrectable. The number of sectors determined to be uncorrectable may be one or more. The error detection and correction circuit 126 may transfer information (e.g., address information) on sectors determined to be uncorrectable to the processor 124.

A bus 127 may provide a channel between the components 121, 122, 124, 125, and 126 of the controller 120. The bus 127 may include, for example, a control bus for transferring various control signals, commands, and the like, and a data bus for transferring a variety of data.

Some of the aforementioned components 121, 122, 124, 125, and 126 of the controller 120 may be deleted, or the aforementioned components 121, 122, 124, 125, and 126 of the controller 120 may be integrated into one component. In some cases, one or more other components may be added in addition to the above-described components of the controller 120.

Figure 2:
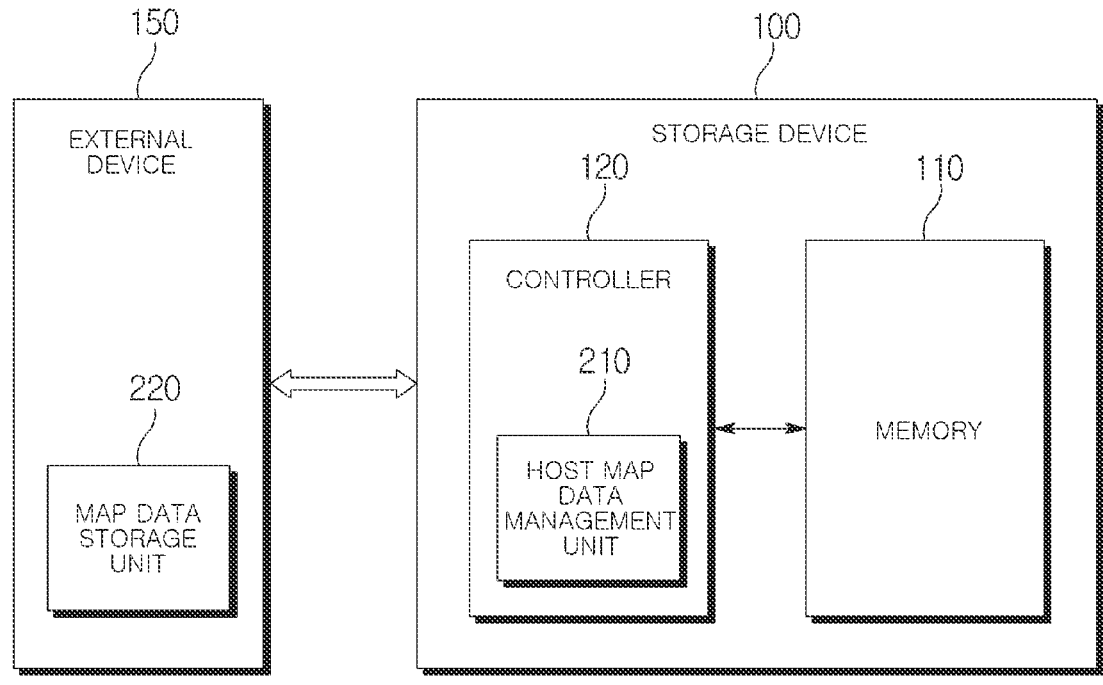
FIG. 2 is a diagram illustrating a storage device to which a host performance booster method is applied according to embodiments of the present disclosure.

FIG. 2 is a diagram illustrating a storage device to which a host performance booster method is applied according to embodiments of the present disclosure. A storage device shown in FIG. 2 may be identical to the storage device 100 shown in FIG. 1, and additionally, an algorithm for realizing a host performance booster method may be executed by the processor 124. Here, the host performance booster method may be a technique for using a memory area of an external device 150 as a cache memory for map data in which mapping information indicating a physical address corresponding to a logical address is recorded.

For example, when map data for a logical address corresponding to data to be read by the external device 150 is stored in the memory area of the external device 150, the external device 150 may provide a physical address obtained by referring to the map data to the storage device 100. Since the external device 150 is able to directly search for a physical address corresponding to a logical address from the map data, the search by the external device 150 may be performed faster than search by the storage device 100. Therefore, read performance for the storage device 100 may be improved when map data for logical addresses expected to be frequently read by the external device 150 are stored in a memory area within the external device 150 in advance.

As shown in FIG. 2, the external device 150 may include a map data storage unit 220. The map data storage unit 220, for example, may be allocated in a part of the memory area of the external device 150 to embody the host performance booster method. Further, the controller 120 of the storage device 100 may include a host map data management unit 210. The host map data management unit 210, for example, may be software that is executable by the processor 124, but may be implemented as hardware according to an embodiment.

In order to improve read operation performance, the host map data management unit 210 may recommend map data for a logical address expected to be frequently read by the external device 150 among map data stored in the storage device 100 to the external device 150. The external device 150 may request map data from the storage device 100 in response to the recommendation by the storage device 100. The storage device 100 may provide map data to the external device 150 in response to a request from the external device 150. The external device 150 may store the provided map data in the map data storage unit 220.

Figure 3:
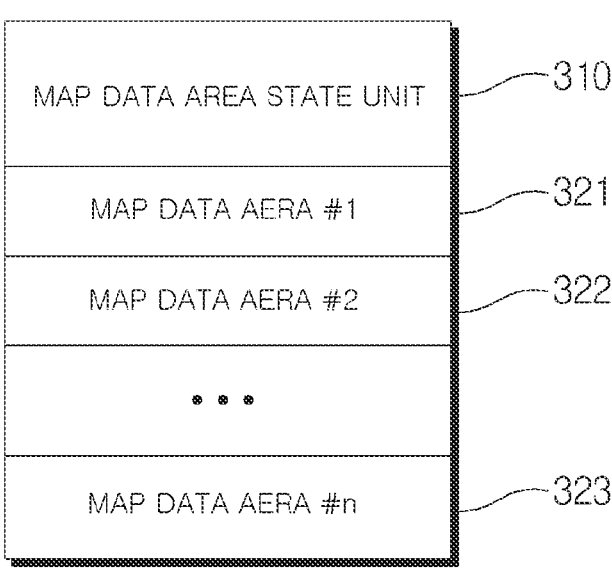
FIG. 3 is a diagram for describing a map data storage unit according to embodiments of the present disclosure.

FIG. 3 is a diagram for describing a map data storage unit according to embodiments of the present disclosure.

Referring to FIG. 3, the map data storage unit 220 may be divided into a plurality of areas, for example, a map data area state unit 310 and a plurality of map data areas 321 to 323. The map data area state unit 310 indicates whether each of the map data areas 321 to 323 is activated or inactivated. Each of the map data area 321 to 323 may store physical address mapping data for a specific logical address area. For example, the map data area 321 may store information on physical addresses mapped to logical addresses 0 to 99. The map data area 321 may store information on physical addresses mapped to logical addresses 100 to 199. Further, the map data area state unit 310 may indicate that each map data area is activated when each map data area stores information on a physical address mapped to one logical address.

When the external device 150 requests a read operation for a specific logical address, the external device 150 may determine whether a map data area storing the specific logical address is activated in the map data area state unit 310. When the map data area is activated, the external device 150 searches for a physical address mapped to the specific logical address in the corresponding map data area. When the external device 150 finds a physical address to which the logical address is mapped as a result of the search, the external device 150 may transmit a read message including information on the corresponding physical address to the storage device 100. When the map data area storing the corresponding logical address is inactivated or a physical address mapped to the corresponding logical address is not found although the map data area is activated, the external device 150 may transmit a read message including logical address information to the storage device 100 to allow the storage device 100 to find a mapped physical address and perform a read operation.

Figure 4:
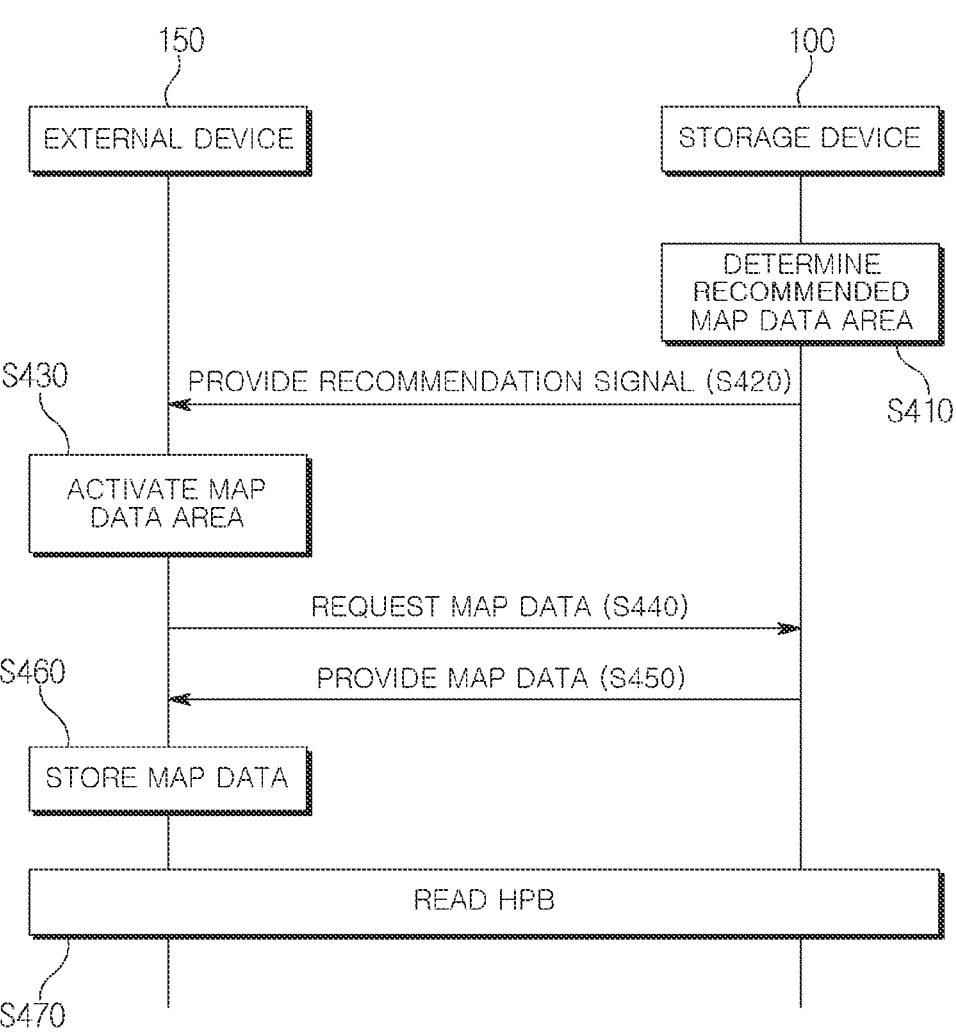
FIG. 4 is a sequence diagram illustrating a read operation based on a host performance booster (HPB) technique according to embodiments of the present disclosure.

FIG. 4 is a sequence diagram illustrating a read operation based on a host performance booster (HPB) method according to embodiments of the present disclosure.

Referring to FIG. 4, the storage device 100 may determine a recommended map data area in operation S410. According to an embodiment, the storage device 100 may determine a map data area satisfying a preset recommendation condition as a recommended map data area. The storage device 100 may set recommendation conditions in advance to recommend a map data area storing a logical address that is expected to be frequently read by the external device 150 based on a recently performed read operation and/or the number of requests to read logical addresses or logical address areas from the external device 150.

In operation S420, the storage device 100 may transmit a recommendation signal corresponding to the determined recommendation logical address area to the external device 150. According to an embodiment, the storage device 100 may transmit a recommendation signal to the external device 150 through a response message (e.g., RESPONSE UPIU) transmitted in response to a command message (e.g., COMMAND UFS Protocol Information Unit (UPIU)) received from the external device 150. Here, the recommendation signal may be map data area information corresponding to a logical address area satisfying a recommendation condition. For example, when the UFS (universal flash storage) protocol is used as a communication interface with the external device 150, the storage device 100 may transfer activated map data area information to the external device 150 using the "HPB Sense Data" field of the RESPONSE UPIU.

In operation S430, the external device 150 may activate a map data area based on the received recommendation signal.

In operation S440, the external device 150 may request map data for a logical address belonging to the activated map data area, and the storage device 100 may provide map data requested by the external device 150 in operation S450. In operation S460, the external device 150 may store received map data in a corresponding map data area. According to an embodiment, operations S440, S450, and S460 may be performed repeatedly until pieces of map data for all logical addresses included in the map data area are obtained.

In operation S470, the external device 150 may read data from the memory 110 of the storage device 100 though an HPB read operation.

Figure 5:
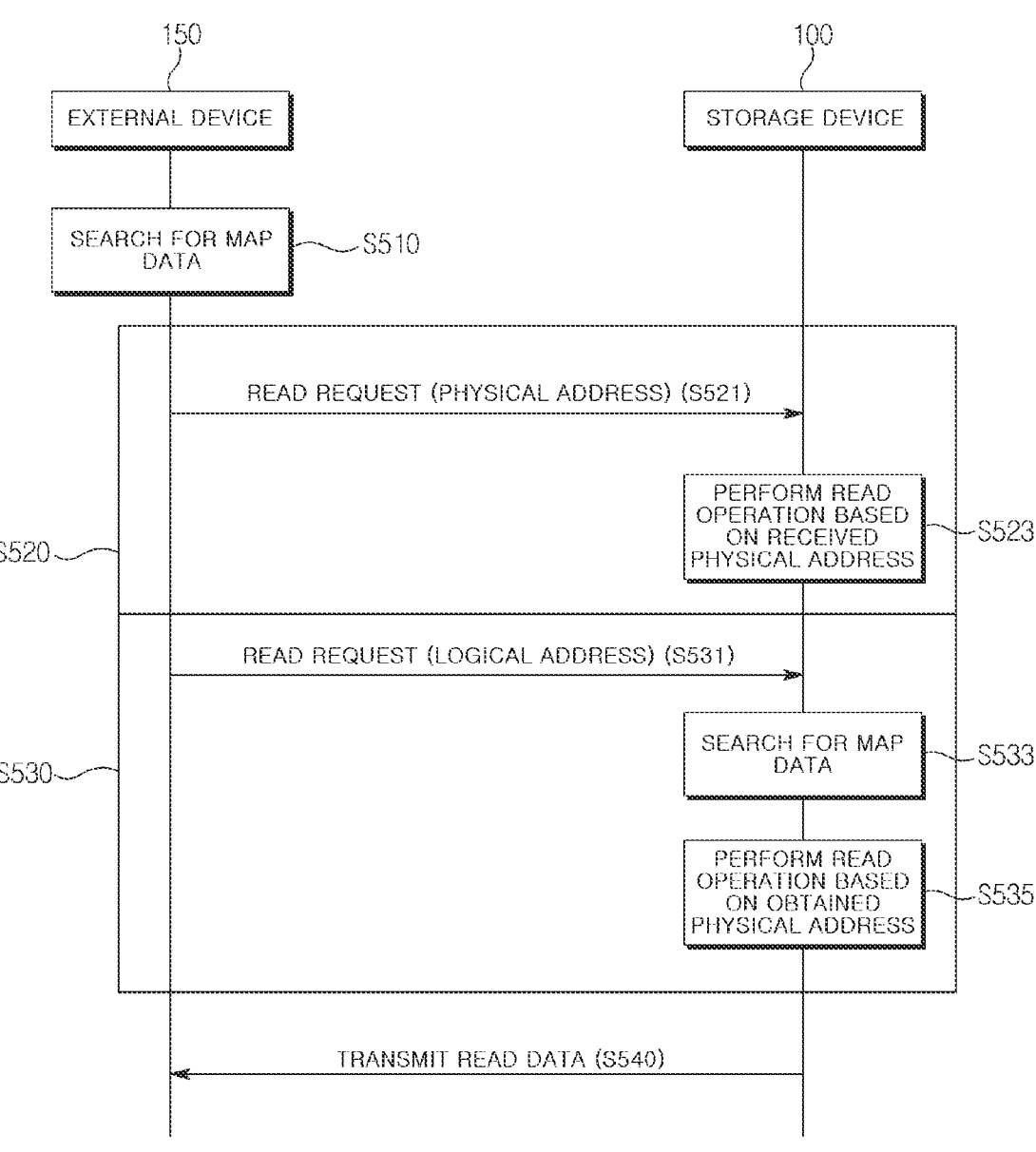
FIG. 5 is a sequence diagram for describing a specific operation of an HPB read operation.

FIG. 5 is a diagram for describing a specific operation of a HPB read operation.

Referring to FIG. 5, in operation S510, when the external device 150 intends to read a specific logical address, the external device 150 may perform a search as to whether map data information for the corresponding logical address exists in the map data storage unit 220. According to an embodiment, the external device 150 may search the map data area state unit 310 to determine whether the map data area storing a corresponding logical address is in an active state, When the corresponding logical address is in an active state, the external device 150 may search for and obtain a physical address corresponding to the logical address by searching the corresponding map data area, and then perform operation S520. When the map data area storing the corresponding logical address is not in an active state as a result of searching the map data area state unit 310, the external device 150 may determine that the external device 150 fails to obtain the physical address for the corresponding logical address and then performs operation S530.

In the process of performing operation S520, the external device 150 may transmit a read request including a physical address to the storage device 100 in operation S521. According to an embodiment, the external device 150 may also transmit information on a logical address corresponding to data to be read.

In operation S523, the storage device 100 receiving the read request including the physical address may obtain read data from the memory 110 based on the received physical address.

In the process of performing operation S530, the external device 150 may transmit a read request including a logical address to the storage device 100 in operation S531.

In operation S533, the storage device 100 that has received the read request including the logical address may search map data and obtain a physical address corresponding to the received logical address in the same manner as a conventional read operation.

In operation S535, the storage device 100 may obtain read data from the memory 110 based on the obtained physical address.

In operation S540, the storage device 100 may transmit the obtained read data to the external device 150.

As described above, the host performance booster method may reduce map searches in the storage device 100 by storing map data in the external device 150, thereby improving overall read performance.

When a sudden power off (SPO) occurs while a read operation is being performed according to the host performance boost technique applied, various recovery operations are performed during the booting process of the storage device, thereby making the map data stored in the map data storage unit 220 of the external device 150 unreliable. Therefore, the storage device 100 may transmit a reset signal for resetting map data through a response message (e.g., RESPONSE UPIU) transmitted to the external device 150 at the time when booting is completed to initialize entire map data stored in the external device 150 and/or inactivate all map data areas.

Meanwhile, when power is normally turned off and then turned on again, there may be no map data being stored in the external device 150 due to an initialization operation, and all pieces of map data may be in an inactive state.

As described above, when the storage device 100 has performed booting and then performs an operation after a sudden power-off, or when power is newly applied after power-off, the storage device 100 is unable to perform an HPB read operation until map data stored in the external device 150 is activated, and performs an operation of searching for and performing translation on a physical address corresponding to a logical address in the storage device in a conventional method, thus resulting in reduction in read performance. In particular, many read operations according to the conventional method may have to be performed until a map data area satisfying a recommendation condition appears.

The present disclosure proposes a method capable of solving a reduction in read performance.

Figure 6:
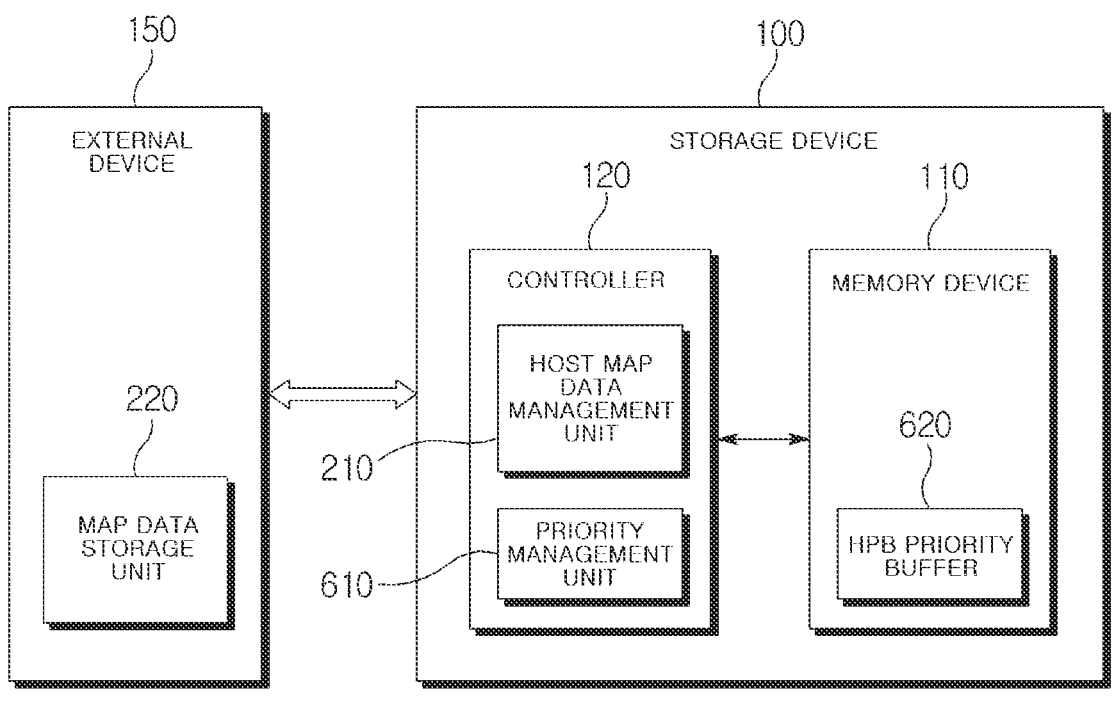
FIG. 6 is a diagram illustrating a storage device to which an improved host performance booster method is applied according to embodiments of the present disclosure.

FIG. 6 is a diagram illustrating a storage device to which an improved host performance booster method is applied according to embodiments of the present disclosure. A storage device shown in FIG. 6 may be identical to the storage device shown in FIG. 1 or 2, and additionally, an algorithm for realizing an improved host performance booster method may be executed by the processor 124. Here, the improved host performance booster method may be embodied by the host map data management unit 210 which is executable by the processor 124 of the storage device 100, a priority management unit 610, and a HPB priority buffer 620 included in the memory 110.

Although the host map data management unit 210 and the priority management unit 610 are displayed as separate modules to clearly show the improvements of the present disclosure, according to an embodiment, the priority management unit 610 may be a part of the host map data management unit 210. Also, according to an embodiment, the host map data management unit 210 and the priority management unit 610 are not limited to software driven by the processor 124 and may be implemented as hardware logics.

Since the operation of the host map data management unit 210 shown in FIG. 6 is the same as the description given with respect to FIG. 2, additional description is omitted.

The priority management unit 610 of the storage device 100 may calculate priorities of the map data areas. According to an embodiment, the priority management unit 610 may calculate priorities only for map data areas which are activated.

The priority management unit 610 may calculate a priority for each map data area by applying a weight according to the number of activations of a map data area, a weight according to a hit count of a logical address included in the map data area, and/or a weight based on a recently-activated map data area.

According to an embodiment, the priority management unit 610 may calculate a usage frequency determined as {(number of activations of map data area*a)+(hit count of logical address included in map data area*b)}.

According to an embodiment, the priority management unit 610 may calculate the usage frequency determined as {(number of activations of map data area*a)+(hit count of logical address included in map data area*b)+activation duration of map data area*c}.

The priority management unit 610 may use various methods for calculating a usage frequency based on at least one of the number of activations of map data area, the hit count of logical addresses included in map data area, and the activation duration of map data area, in addition to the above-described two methods of calculating a usage frequency.

The priority management unit 610 may determine the priority of each map data area by assigning the highest priority to map data area with the highest usage frequency and the lowest priority to map data area with the lowest usage frequency. Here, a, b, and c are variables that are tunable to preset values, and may be optimized through tests or simulations.

The priority management unit 610 of the storage device 100 may store information on K map data areas having high priorities based on the usage frequency of each map data area in the HPB priority buffer 620 of the memory 110 at a regular period or when a preset event occurs. According to an embodiment, the HPB priority buffer 620 may be a part of a history buffer, and the regular period may be a history block update period. According to an embodiment, the preset event may be a history block update event.

FIG. 7 is a flowchart for describing an improved host performance booster read operation in the storage device 100 shown in FIG. 6.

Referring to FIG. 7, in operation S710, the storage device 100 may receive a read request from the external device 150 and perform a HPB read operation (i.e., HPB-based read operation). The HPB read operation may refer to the operation shown in FIG. 5.

The storage device 100 may obtain information on activation of map data areas and information on hit counts of the map data areas in operation S720 while performing the HPB read operation.

In addition, in operation S730, the storage device 100 may calculate a usage frequency for each map data area based on the information obtained in operation S720. According to an embodiment, the storage device 100 may calculate the usage frequency for each map data area based on {(number of activations of the map data area*a)+(hit count of logical address included in map data area*b)}. Here, hit may mean that there is a read request for a corresponding logical address.

In operation S740, the storage device 100 may store information on K map data areas with high usage frequencies in a non-volatile memory. According to an embodiment, the non-volatile memory may be the memory 110, and the storage device 100 may set and store the HPB priority buffer 620 in an area set as a history buffer in the memory 110. According to an embodiment, the non-volatile memory may be a non-volatile memory other than the memory 110.

According to an embodiment, the storage device 100 may store information on L map data areas with high usage frequencies at the time when a predetermined time has elapsed after the storage device has been booted, in a second HPB priority buffer (not shown) of the non-volatile memory. The second HPB priority buffer may be different from the HPB priority buffer 620. After the storage device 100 has been powered on and booted, a map data area written in the second HPB priority buffer is recommended regardless of whether the recommendation condition is satisfied, map data is stored in the corresponding map data area of the map data storage unit of the external device 150, and the corresponding map data area is then activated. The above-described operation may enable the storage device 100 to quickly enter the HPB read operation even when power is normally or suddenly turned off and is again normally turned on, thereby improving read performance.

Figure 8:
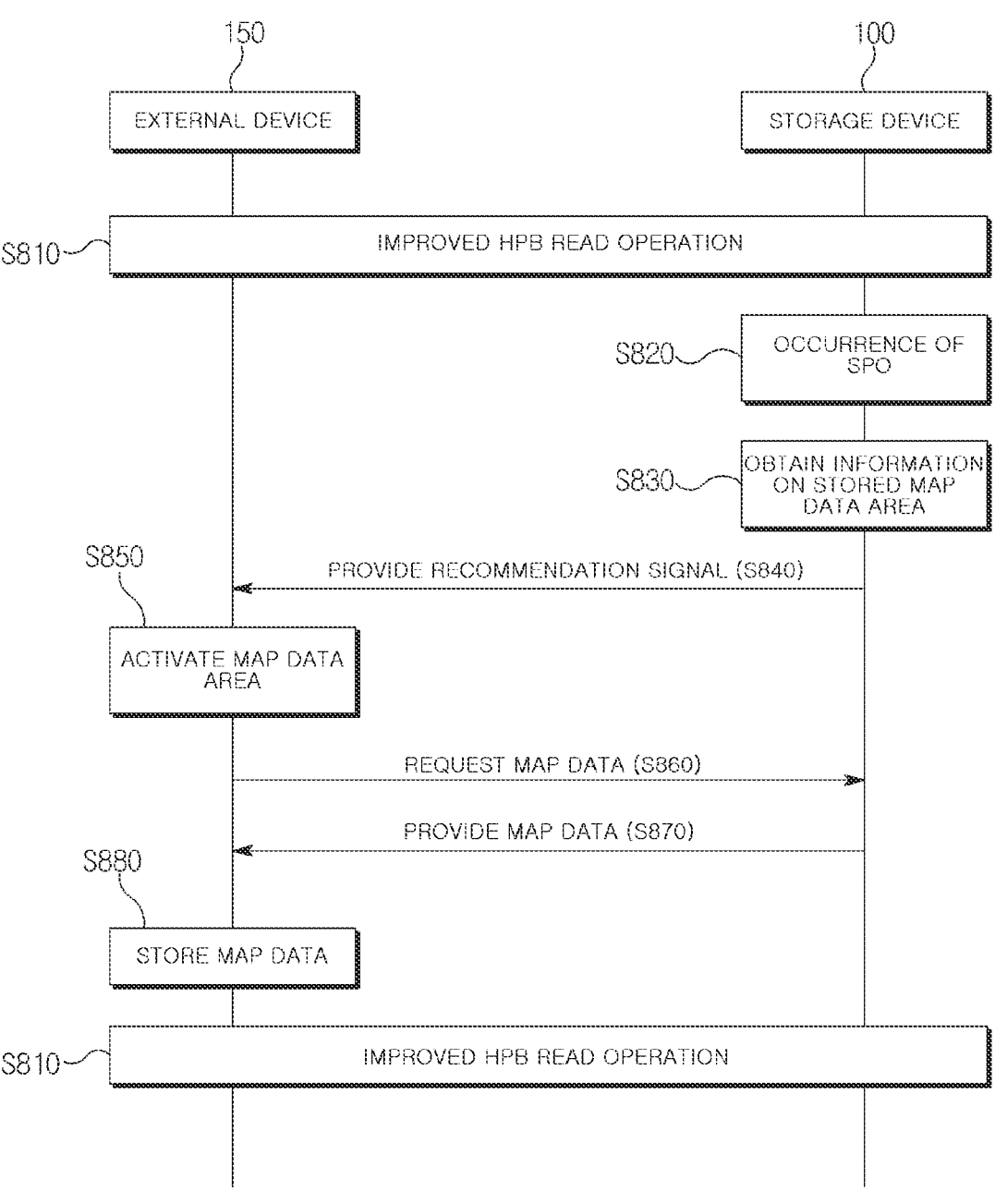
FIG. 8 is a sequence diagram illustrating an operation based on the improved host performance booster method when an SPO occurs according to embodiments of the present disclosure.

FIG. 8 is a diagram illustrating an operation based on the improved host performance booster method when an SPO occurs according to embodiments of the present disclosure.

Referring to FIG. 8, the storage device 100 may perform an improved host performance booster (HPB) read operation (i.e., improved HPB-based read operation) in operation S810. The improved HPB read operation is the operation shown in FIG. 7 according to an embodiment and may refer to an operation of determining a priority for an activated map data area while performing an HPB read operation and periodically storing the priority in the HPB priority buffer provided in a non-volatile memory.

During normal data reading and programming between the external device 150 and the storage device 100, a sudden power-off (SPO) may occur as in operation S820. When the sudden power-off (SPO) occurs, the storage device 100 may perform booting when power is applied again, and may perform various recovery operations during the booting process. Accordingly, there is a possibility that a physical address corresponding to a logical address may be changed, and thus map data stored in the map data storage unit 220 of the external device 150 may not be reliable. Therefore, the storage device 100 may transmit a reset signal for resetting map data through a response message (e.g., RESPONSE UPIU) transmitted to the external device 150 at the time when booting is completed to initialize entire map data stored in the external device 150 and/or inactivate all map data areas.

In operation S830 thereafter, the storage device 100 may obtain information on map data areas stored in the HPB priority buffer 620. The information on map data areas stored in the HPB priority buffer 620 may indicate map data areas that have been frequently used during the improved HPB read operation, before a sudden power-off (SPO) occurs.

In operation S840, the storage device 100 may provide a recommendation signal for activating a map data area obtained in operation S830 to the external device 150. According to an embodiment, when there are a plurality of map data areas to be activated, that is, when information on a plurality of map data areas is stored in the HPB priority buffer 620, the storage device 100 may have the information on all map data areas to be activated in the recommendation signal and provide the information to the external device 150. In an embodiment, the storage device 100 may sequentially provide a separate recommendation signal for each map data area.

According to an embodiment, the storage device 100 may provide information on an activated map data area to the external device 150 using the "HPB Sense Data" field of the RESPONSE UPIU.

Operations S850 to S880 are operations in which the external device 150 obtains and stores information on a physical address corresponding to a logical address included in an activated map data area and the corresponding operations are identical to the operations S430 to S460 of FIG. 4.

As described above, even when a sudden power-off occurs, activated map data are stored in the map data storage unit 220 of the external device 150, thereby resolving degradation in read performance after a sudden power-off has occurred and improving read performance.

Figure 9:
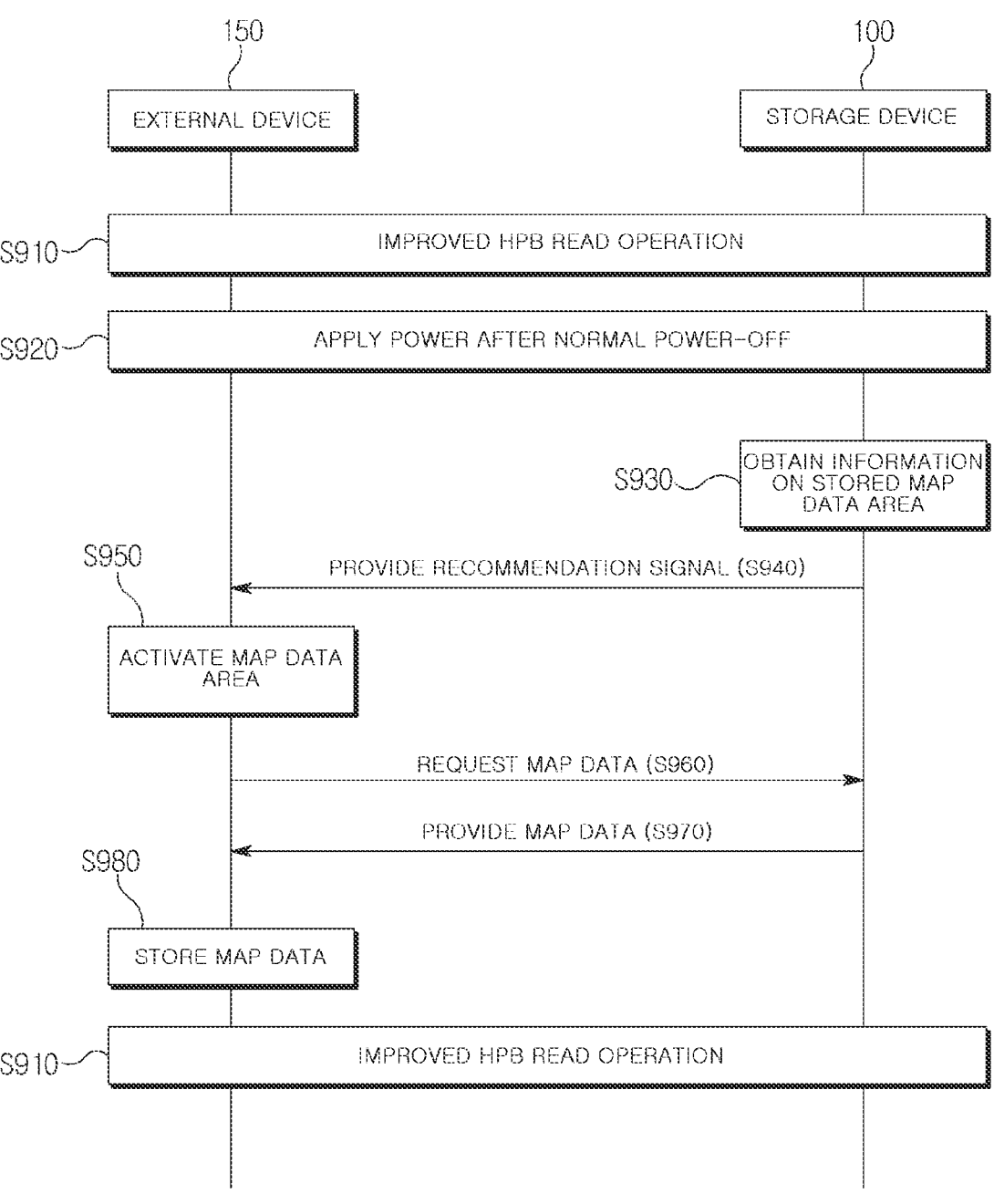
FIG. 9 is a sequence diagram illustrating an operation based on the improved host performance booster method when power is re-applied after normal power-off according to embodiments of the present disclosure.

FIG. 9 is a diagram illustrating an operation based on the improved host performance booster method when power is re-applied after normal power-off according to embodiments of the present disclosure.

Referring to FIG. 9, the storage device 100 may perform an improved host performance booster (HPB) read operation (i.e., improved HPB-based read operation) in operation S910. The improved HPB read operation is the operation shown in FIG. 7 according to an embodiment and may refer to an operation of determining a priority for an activated map data area while performing an HPB read operation and periodically storing the priority in the HPB priority buffer provided in a non-volatile memory.

During normal data reading and programming between the external device 150 and the storage device 100, power is normally turned off, and after a certain period of time, the power is applied again in operation S920. According to an embodiment, only the storage device 100 may be powered off normally and then re-powered. According to another embodiment, both the external device 150 and the storage device 100 may be powered off normally and then re-powered.

When power is turned off and then power is applied again, the map data storage unit 220 provided in the volatile memory area of the external device 150 may be reset or initialized to have no map data.

When power is normally applied again, the storage device 100 may have been normally booted in operation S930 and may obtain information on map data areas stored in a second HPB priority buffer. As described above, the information on map data areas stored in the second HPB priority buffer is map data area information stored based on the usage frequency for each map data area at the time when a certain period of time has elapsed after the storage device 100 has been booted, and may be different from information on map data areas stored in the HPB priority buffer 620, which is periodically stored. According to an embodiment, the number of map data areas stored in the second HPB priority buffer may be different from the number of map data areas stored in the HPB priority buffer 620.

In the above-described example, it has been described that the storage device 100 selects information on map data areas stored in the second HPB priority buffer based on the usage frequency of each map data area. However, according to an embodiment, the external device 150 may specify information on map data areas stored in the second HPB priority buffer. For example, the external device 150 may identify an application that reads data after the storage device 100 has been booted, recognize in advance a map data area storing logical address areas mainly read by the corresponding application, and store the corresponding map data area in the second HPB priority buffer.

According to an embodiment, the information on map data areas set by the external device 150 may be stored in the third HPB priority buffer, and information on map data areas recorded in the second HPB priority buffer or the third HPB priority buffer may be used according to a request from the external device 150 or a parameter previously set by the external device 150.

Operations S940 to S980 are operations in which the external device 150 obtains and stores information on a physical address corresponding to a logical address included in a map data area which is recommended and then activated, and the corresponding operations are identical to the operations S840 to S880 of FIG. 8.

As described above, activated map data can be immediately stored in the map data storage unit 220 of the external device 150 even when power is applied again after normal power-off, resolving degradation in read performance after power is newly applied and improving performance.

Accordingly, the improved host performance booster method according to the present disclosure may improve overall read performance by resolving an issue in which read performance decreases after power is newly applied after a sudden power-off or normal power-off.

According to embodiments of the present disclosure, it is possible to reduce the time required to form map data in an external device.

While embodiments of the present invention have been described with reference to the attached drawings, it would be understood by those of ordinary skill in the art that the technical configuration of the present invention may be implemented in other detailed forms without changing the technical spirit or the essential features of the present invention. Thus, it should be noted that the above-described embodiments are provided as examples and should not be interpreted as limiting. Moreover, the scope of the present invention should be defined by the following claims rather than the detailed description provided above. Furthermore, the meanings and scope of the claims and all changes or modified forms derived from their equivalents should be construed as falling within the scope of the present invention. The embodiments may be combined to form additional embodiments.

What is claimed is:

1. An operation method of a storage device, the operation method comprising:

performing a host performance booster (HPB) read operation of reading data from a non-volatile memory of the storage device in response to a read request from an external device using map data stored in a plurality of map data areas of a volatile memory area of the external device;

storing information on at least one map data area with a high usage frequency among the plurality of map data areas in a first region of the non-volatile memory, based on a usage frequency for the plurality of map data areas, and determining the usage frequency based on a number of activations for each of the plurality of map data areas, a number of the HPB read request from the external device, and an activation duration of each of the plurality of map data areas.

2. The operation method of claim 1, wherein the storing the information comprises storing the information on the at least one map data area with the high usage frequency among the plurality of map data areas in the first region of the non-volatile memory at a regular period or when a preset event occurs.

3. The operation method of claim 2, further comprising: when power is applied again after a sudden power-off representing that power is suddenly cut off during normal operation, obtaining the information on the at least one map data area stored in the first region of the non-volatile memory; and transmitting the information on the at least one map data area to the external device.

4. The operation method of claim 3, wherein the transmitting the information on the at least one map data area to the external device comprises transmitting the information on the at least one map data area using an HPB Sense Data field of a RESPONSE UPIU message included in a universal flash storage (UFS) protocol standard.

5. The operation method of claim 1, wherein the storing the information comprises storing information on at least one map data area to be activated after booting in a second region of the non-volatile memory based on a request from the external device.

6. The operation method of claim 5, further comprising: when power is applied to the memory controller after normal power-off, obtaining the information on the at least one map data area stored in the second region of the non-volatile memory; and transmitting a recommendation signal for activating the at least one map data area to the external device.

7. The operation method of claim 1, further comprising:

transmitting a recommendation signal including information on a map data area, of which activation is recommended, to the external device;

receiving a map data request for a first map data area from the external device; and transmitting map data included in the first map data area to the external device based on the map data request.

8. The operation method of claim 7, wherein the performing the HPB read operation comprises:

reading data from the memory based on a physical address when the read request from the external device includes the physical address; and when the read request from the external device includes a logical address and no physical address, obtaining a physical address based on the logical address and reading data from the memory based on the physical address.

9. A memory controller comprising:

a host interface configured to communicate with an external device;

a memory interface configured to communicate with a non-volatile memory; and a controller configured to:

transmit a recommendation signal including information on a map data area of which activation is recommended to the external device, transmit map data included in a first map data area to the external device based on reception of a map data request for the first map data area from the external device, perform a host performance booster (HPB) read operation of reading data from the non-volatile memory in response to a read request from the external device using map data stored in a plurality of map data areas of a volatile memory area of the external device, and store information on at least one map data area with a high usage frequency among the plurality of map data areas in a first region of the non-volatile memory, based on a usage frequency for the plurality of map data areas, wherein the controller is configured to determine the usage frequency based on a number of activations for each of the plurality of map data areas, a number of the HPB read request from the external device, and an activation duration of each of the plurality of map data areas.

10. The memory controller of claim 9, wherein the controller is configured to store the information on the at least one map data area with the high usage frequency among the plurality of map data areas in the first region of the non-volatile memory at a regular period or when a preset event occurs.

11. The memory controller of claim 10, wherein the controller is configured to, when power is applied again after sudden power-off representing that power is suddenly cut off during normal operation:

obtain the information on the at least one map data area stored in the first region of the non-volatile memory and transmit the information on the at least one map data area to the external device.

12. The memory controller of claim 11, wherein the controller is configured to transmit the information on the at least one map data area to the external device using an HPB Sense Data field of a RESPONSE UPIU message included in a universal flash storage (UFS) protocol standard.

13. The memory controller of claim 9, wherein the controller is configured to store information on at least one map data area to be activated after booting in a second region of the non-volatile memory based on a request from the first external, and wherein, when power is applied again after normal power-off, the controller is configured to:

obtain the information on the at least one map data area stored in the second region of the non-volatile memory; and transmit a recommendation signal for activating the at least one map data area to the external device.

14. A storage device comprising:

a non-volatile memory; and a memory controller configured to:

transmit a recommendation signal including information on a map data area of which activation is recommended to an external device, transmit map data included in a first map data area to the external device based on reception of a map data request for the first map data area from the external device, perform a host performance booster (HPB) read operation of reading data from the non-volatile memory in response to a read request from the external device using the map data stored in the external device, and store information on at least one map data area with a high usage frequency among the plurality of map data areas in the non-volatile memory, based on a usage frequency for the plurality of map data areas, wherein the memory controller is configured to determine the usage frequency based on a number of activations for each of the plurality of map data areas, a number of the HPB read request from the external device, and an activation duration of each of the plurality of map data areas.

15. The storage device of claim 14, wherein the memory controller is configured to store the information on the at least one map data area with the high usage frequency among the plurality of map data areas in the first region of the non-volatile memory at a regular period or when a preset event occurs, and/or wherein the memory controller is configured to store the information on at least one map data area with the high usage frequency than other map data areas of the plurality of map data areas once when a predetermined time has elapsed after booting, in a second region of the non-volatile memory, or store information on at least one map data area to be activated after booting based on a request from the external device in the second region of the non-volatile memory.

16. The storage device of claim 15, wherein, when power is applied again after sudden power-off representing that power is suddenly cut off during normal operation or after normal power-off, the memory controller is configured to obtain the information on the at least one map data area stored in the first region of the non-volatile memory and/or in the second region of the non-volatile memory, and transmit the information on the at least one map data area to the external device.

17. The storage device of claim 16, wherein the memory controller is configured to transmit the information on the at least one map data area to the external device using an HPB Sense Data field of a RESPONSE UPIU message included in a universal flash storage (UFS) protocol standard.

* * * * *